United States Patent
Takaiwa et al.

(10) Patent No.: US 10,266,641 B2
(45) Date of Patent: Apr. 23, 2019

(54) EPOXY RESIN COMPOSITION FOR FIBER-REINFORCED COMPOSITE MATERIAL, PREPREG AND FIBER-REINFORCED COMPOSITE MATERIAL

(71) Applicant: TORAY INDUSTRIES, INC., Tokyo (JP)

(72) Inventors: Reo Takaiwa, Ehime (JP); Kentaro Sano, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 48 days.

(21) Appl. No.: 15/507,929

(22) PCT Filed: Jul. 16, 2015

(86) PCT No.: PCT/JP2015/070391
§ 371 (c)(1),
(2) Date: Mar. 1, 2017

(87) PCT Pub. No.: WO2016/035459
PCT Pub. Date: Mar. 10, 2016

(65) Prior Publication Data
US 2017/0291985 A1  Oct. 12, 2017

(30) Foreign Application Priority Data
Sep. 2, 2014  (JP) .................. 2014-177782

(51) Int. Cl.
| | | |
|---|---|---|
| B32B 27/38 | (2006.01) |
| B32B 27/26 | (2006.01) |
| B32B 27/20 | (2006.01) |
| B32B 27/04 | (2006.01) |
| C08J 5/24 | (2006.01) |
| C08G 59/40 | (2006.01) |
| C08G 59/68 | (2006.01) |
| C08L 63/00 | (2006.01) |
| C08G 59/46 | (2006.01) |
| C08K 3/38 | (2006.01) |
| C08K 5/315 | (2006.01) |
| C08K 5/3445 | (2006.01) |
| C08G 59/22 | (2006.01) |
| C08G 59/24 | (2006.01) |
| C08G 59/38 | (2006.01) |
| C08G 59/50 | (2006.01) |
| C08J 5/04 | (2006.01) |
| C09J 163/00 | (2006.01) |

(52) U.S. Cl.
CPC ....... *C08G 59/4021* (2013.01); *C08G 59/226* (2013.01); *C08G 59/245* (2013.01); *C08G 59/38* (2013.01); *C08G 59/46* (2013.01); *C08G 59/5073* (2013.01); *C08J 5/042* (2013.01); *C08J 5/24* (2013.01); *C08K 3/38* (2013.01); *C08K 5/315* (2013.01); *C08K 5/3445* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 2,633,458 A | * | 3/1953 | Shokal | C08G 59/1416 264/164 |
| 3,631,150 A | * | 12/1971 | Green | C08G 59/4021 528/123 |
| 4,533,715 A | * | 8/1985 | Lee | C08G 18/003 525/396 |

(Continued)

FOREIGN PATENT DOCUMENTS

| | | | | |
|---|---|---|---|---|
| JP | 6198745 A | | 5/1986 | |
| JP | 01297434 A | * | 11/1989 | ............... C08J 5/24 |
| JP | 06172495 A | | 6/1994 | |

(Continued)

OTHER PUBLICATIONS

Machine translation of JP-01297434-A (no date).*

(Continued)

*Primary Examiner* — Michael J Feely
(74) *Attorney, Agent, or Firm* — RatnerPrestia

(57) ABSTRACT

Provided are: an epoxy resin composition for fiber-reinforced composite materials, which has a good balance between storage stability and fast curing properties at high levels; a prepreg; and an epoxy resin composition which exhibits excellent mechanical characteristics as a fiber-reinforced composite material. A resin composition which contains an epoxy resin, dicyandiamide, an imidazole compound and an acidic compound, while satisfying the following conditions (a)-(c):

(d) The time until the heat flow rate reaches the peak top after the epoxy resin composition reaches 100° C. is 25 minutes or less as measured by a differential scanning calorimeter at an isothermal temperature of 100° C. in a nitrogen gas stream.

(e) The time until the heat flow rate reaches the peak top after the epoxy resin composition reaches 60° C. is 15 hours or more as measured by a differential scanning calorimeter at an isothermal temperature of 60° C. in a nitrogen gas stream.

(f) The ratio of the number of epoxy groups to the number of imidazole rings in the epoxy resin composition is from 25 to 90 (inclusive).

6 Claims, No Drawings

(56) References Cited

U.S. PATENT DOCUMENTS

| | | | | | |
|---|---|---|---|---|---|
| 5,508,328 | A | * | 4/1996 | Olson | .................... C08G 59/18 |
| | | | | | 523/445 |
| 2014/0045973 | A1 | * | 2/2014 | Bharadwaj | ............... C08K 5/55 |
| | | | | | 523/400 |

FOREIGN PATENT DOCUMENTS

| JP | 07304968 | A | | 11/1995 | |
|---|---|---|---|---|---|
| JP | 08104737 | A | | 4/1996 | |
| JP | 09157498 | A | | 6/1997 | |
| JP | 09268224 | A | | 10/1997 | |
| JP | 11302412 | A | * | 11/1999 | ................ C08J 5/24 |
| JP | 2003301029 | A | | 10/2003 | |
| JP | 2004027159 | A | | 1/2004 | |
| JP | 2004075914 | A | | 3/2004 | |
| JP | 2009242549 | A | | 10/2009 | |
| JP | 2010116521 | A | | 5/2010 | |
| JP | 2010248479 | A | | 11/2010 | |

OTHER PUBLICATIONS

Machine translation of JP-11302412-A (no date).*
International Search Report and Written Opinion for International Application No. PCT/JP2015/070391, dated Sep. 15, 2015 8 pages.

* cited by examiner

EPOXY RESIN COMPOSITION FOR FIBER-REINFORCED COMPOSITE MATERIAL, PREPREG AND FIBER-REINFORCED COMPOSITE MATERIAL

CROSS REFERENCE TO RELATED APPLICATIONS

This is the U.S. National Phase application of PCT International Application No. PCT/JP2015/070391, filed Jul. 16, 2015 and claims priority to Japanese Patent Application No. 2014-177782, filed Sep. 2, 2014, the disclosures of these applications being incorporated herein by reference in their entireties for all purposes.

FIELD OF THE INVENTION

The present invention relates to an epoxy resin composition adapted for use as a matrix resin of a fiber-reinforced composite material suitable for sport applications and general industry applications. The present invention also relates to a prepreg and a fiber-reinforced composite material prepared by using such epoxy resin composition for the matrix resin.

BACKGROUND OF THE INVENTION

Epoxy resins have excellent mechanical properties, and therefore, they are used in various industrial applications including coating compositions, adhesives, electric and electronic information materials, and advanced composite materials. More specifically, epoxy resins are frequently used in the fiber-reinforced composite material comprising a reinforcement fiber such as carbon fiber, glass fiber, and aramid fiber and a matrix resin.

Use of a prepreg produced by impregnating an epoxy resin in the carbon fiber substrate is popular in the production of the fiber-reinforced composite material. The prepreg is laminated or preformed, and then heated to cure the epoxy resin and thereby produce a molded article. The property primarily required for a prepreg is that the molded article exhibits good mechanical properties. Recently, however, other properties such as good productivity, namely, high-speed curability are also required. This trend is prominent in industrial applications such as automobile applications where the productivity is particularly needed.

In addition, current prepregs are reactive at room temperature, and freezer installation is generally required for the storage of the prepreg. This requires preliminary arrangement of the freezer installation and thawing before the use. Accordingly, there has been a demand for a prepreg having an improved storage stability which can be stored at room temperature and which have high handling convenience.

With regard to the technology of improving the storage stability, Patent Document 1 and Patent Document 2 disclose a stabilization method by microcapsulation, namely, by coating the surface of the epoxy curing agent by a substance which does not react with the epoxy resin.

Patent Document 3 discloses a method for coating the surface of size-controlled amine particles with a borate ester compound. Patent Document 3 also describes that storage stability and curability can be realized to sufficient degree.

Patent Document 4 discloses a method wherein time between the start of the curing and the reaching of the curing degree to certain level is controlled, and wherein a curing agent having a limited particle size and limited curing temperature is used. Patent Document 4 describes simultaneous realization of storage stability and high-speed curability.

PRIOR ART DOCUMENT

Patent Document

Patent Document 1: Japanese Unexamined Patent Publication (Kokai) No. 7-304968
Patent Document 2: Japanese Unexamined Patent Publication (Kokai) No. 2009-242459
Patent Document 3: Japanese Unexamined Patent Publication (Kokai) No. 2003-301029
Patent Document 4: Japanese Unexamined Patent Publication (Kokai) No. 2004-75914

SUMMARY OF THE INVENTION

Problems to be Solved by the Invention

However, the methods described in Patent Document 1 and Patent Document 2 required at least 1 hour for the curing of the resin composition and the curing speed was insufficient.

Patent Document 3 did disclose a resin composition having a high storage stability. However, Patent Document 3 did not examine curing speed, and it was also silent about the modulus and deformation which is important for the mechanical properties of the carbon fiber-reinforced plastic material.

Furthermore, the method described in Patent Document 4 was still incapable of realizing sufficient balance between the storage stability and the high-speed curability, and the Patent Document 4 was silent about modulus and deformation of the cured resin material which is important for the mechanical properties of the carbon fiber-reinforced plastic material.

Accordingly, an object of the present invention is to provide an epoxy resin composition and a prepreg which simultaneously realize storage stability and high-speed curability at high level. Another object of the present invention is to provide an epoxy resin composition which is capable of providing a fiber-reinforced composite material having excellent mechanical properties.

Means for Solving the Problems

In order to solve the problems as described above, the inventors of the present invention conducted an intensive examination, and found the epoxy resin composition having constitution as described below. The present invention has been completed on the bases of such finding. Accordingly, the present invention has the following constitution:

An epoxy resin composition for fiber-reinforced composite material comprising the following components [A], [B], and [C]:

[A] an epoxy resin,
[B] a dicyandiamide, and
[C] an imidazole compound, wherein the composition satisfies the following conditions [a], [b], and [c]:

[a] time interval between reaching to 100° C. and reaching of the heat flow to the top of the peak is up to 25 minutes when the epoxy resin composition is isothermally analyzed at 100° C. by using a differential scanning colorimeter in nitrogen stream,

[b] time interval between reaching to 60° C. and reaching of the heat flow to the top of the peak is at least 15 hours when the epoxy resin composition is isothermally analyzed at 60° C. by using a differential scanning colorimeter in nitrogen stream, and

[c] ratio of the number of the epoxy groups to the number of imidazole rings in the epoxy resin composition is at least 25 and up to 90.

Advantageous Effect of the Invention

The present invention is capable providing an epoxy resin composition for a fiber-reinforced composite material which has excellent high-speed curability and storage stability and wherein the reinforced composite material prepared by curing the prepreg has a high mechanical properties. The present invention is also capable of providing a prepreg and a fiber-reinforced composite material prepared by using such epoxy resin composition.

DESCRIPTION OF PREFERRED EMBODIMENTS

The epoxy resin composition for fiber-reinforced composite material of the present invention comprises [A] an epoxy resin, [B] a dicyandiamide, and [C] an imidazole compound as its critical components.

(Component [A])

The component [A] of the present invention is an epoxy resin. Exemplary epoxy resins include bisphenol A type epoxy resins, bisphenol F type epoxy resins, bisphenol S type epoxy resins, biphenyl type epoxy resins, naphthalene type epoxy resins, novolac type epoxy resins, epoxy resins having fluorene backbone, epoxy resins prepared by using a copolymer of a phenol compound and dicyclopentadiene for the starting material, glycidyl ether type epoxy resins such as diglycidyl resorcinol, tetrakis(glycidyloxy phenyl)ethane, and tris(glycidyloxy phenyl)methane, and glycidylamine type epoxy resins such as tetraglycidyl diaminodiphenylmethane, triglycidyl aminophenol, triglycidyl aminocresol, tetraglycidyl xylene diamine.

Of these, the preferred are bisphenol A type epoxy resins, bisphenol F type epoxy resins, bisphenol S type epoxy resins, biphenyl type epoxy resins, naphthalene type epoxy resins, novolac type epoxy resins, epoxy resins having fluorine backbone, epoxy resins prepared by using a copolymer of a phenol compound and dicyclopentadiene for the starting material, glycidyl ether type epoxy resins such as diglycidyl resorcinol, tetrakis(glycidyloxy phenyl)ethane, and tris(glycidyloxy phenyl)methane, which may be used alone or as a combination of two or more.

(Component [B])

The component [B] of the present invention is a dicyandiamide. The dicyandiamide is a compound represented by the chemical formula $(H_2N)_2C=N-CN$, and the dicyandiamide is widely used as a curing agent of the epoxy resin in view of its excellent ability to impart the cured resin material composition with high mechanical properties and heat resistance. Examples of the commercially available dicyandiamide include DICY7, DICY15 (manufactured by Mitsubishi Chemical Corporation).

Incorporation of the dicyandiamide [B] in the form of a powder is preferable in view of its storage stability at room temperature and stability of the viscosity in the production of the prepreg. Preliminary dispersion of the dicyandiamide [B] in a part of the epoxy resin in the component [A] by using three rolls and the like is also preferable in view of producing a consistent epoxy resin composition to thereby improve physical properties of the cured article.

When the dicyandiamide is incorporated as a powder, the average particle size is preferably up to 10 μm, and more preferably up to 7 μm. For example, when the epoxy resin composition is impregnated in the reinforcement fiber bundle by applying heat and pressure in the course of producing the prepreg, impregnation of the epoxy resin composition in the fiber bundle will be facilitated by the use of the dicyandiamide having the average particle size of up to 10 μm.

Total content of the dicyandiamide [B] is preferably a content such that amount of the active hydrogen group is in the range of 0.3 to 1.0 equivalent weight, and more preferably 0.3 to 0.6 equivalent weight in relation to the epoxy group in all epoxy resin components in the epoxy resin composition. When the content of the active hydrogen group is in such range, production of the cured resin material having well-balanced heat resistance and mechanical properties will be enabled.

(Component [C])

The component [C] in the present invention is an imidazole compound. In the present invention, the component [C] functions as a curing accelerator of the component [B]. Exemplary imidazole compounds include those represented by the following formula (I):

[Chemical formula 1]

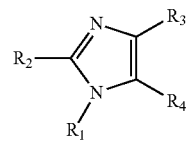

(I)

wherein $R_1$ to $R_2$ are hydrogen or an alkyl group, aryl group or aralkyl group having 1 or more substituents selected from halogen, hydroxy group, and cyano group and $R_3$ to $R_4$ are hydrogen or an alkyl group, aryl group or aralkyl group having 1 or more substituents selected from halogen, hydroxy group, and cyano group. The alkyl group as used herein is a substituent derived from a hydrocarbon which may have a straight chain, branched, or cyclic structure. The aryl group is a substituent derived from an aromatic hydrocarbon, and examples include those solely comprising an aromatic ring such as phenyl group and naphthyl group, and also, those containing an aromatic hydrocarbon structure as its moiety as in the case of tolyl group. An aralkyl group is an alkyl group having an aryl group as its substituent, and examples include benzyl group and phenylethyl group.

Exemplary imidazole compounds include 1-benzyl-2-methyl imidazole, 1-benzyl-2-ethyl imidazole, 1-cyanoethyl-2-methyl imidazole, 1-cyanoethyl-2-ethyl-4-methyl imidazole, and 1-cyanoethyl-2-phenyl imidazole, which may be used alone or in combination of two or more.

(Analysis of the Epoxy Resin Composition Using a Differential Scanning Colorimeter)

In the present invention, curability of the epoxy resin composition is conducted, for example, by using a differential scanning colorimeter.

The exotherm that can be observed in the measurement using a differential scanning colorimeter is the one generated by the reaction of the epoxy resin composition. Accordingly, the exothermic chart plotted by using x axis for the time and y axis for the heat flow rate in an isothermal measurement represents time dependency of the reaction speed at the temperature of the measurement. Therefore, the time of the exothermic peak top appearance is the time when the reaction is most active at the temperature of the measurement, and this time can be used as an index of the reactivity.
(Isothermal Analysis of the Epoxy Resin Composition at 100° C. Using a Differential Scanning Colorimeter)

In the present invention, when the epoxy resin composition is isothermally analyzed at 100° C. by using a differential scanning colorimeter and time interval between reaching to 100° C. and reaching of the heat flow to the top of the peak is designated T(100), the T(100) is preferably up to 25 minutes and more preferably up to 24 minutes. Use of an epoxy resin composition exhibiting the T(100) of up to 25 minutes for the matrix resin enables production of the prepreg having excellent high-speed curability. The prepreg produced by using an epoxy resin composition exhibiting the T(100) of greater than 25 minutes for the matrix resin has insufficient high-speed curability.
(Isothermal Analysis of the Epoxy Resin Composition at 60° C. Using a Differential Scanning Colorimeter)

When the epoxy resin composition is isothermally analyzed at 60° C. and time interval between reaching to 60° C. and reaching of the heat flow to the top of the peak is designated T(60), the T(60) is preferably at least 15 hours and more preferably at least 21 hours. Use of an epoxy resin composition exhibiting the T(60) of at least 15 hours minutes for the matrix resin enables production of the prepreg having excellent storage stability. The prepreg produced by using an epoxy resin composition exhibiting the T(60) of less than 15 hours for the matrix resin has insufficient storage stability.
(Ratio of the Number of the Epoxy Group to the Number of Imidazole Ring in the Epoxy Resin Composition)

In addition, the epoxy resin composition of the present invention has the ratio of the number of the epoxy groups to the number of imidazole rings in the epoxy resin composition of at least 25 and up to 90. When this ratio is less than 25, proportion of the self-polymerization in the epoxy resin will be increased and the cured resin material becomes brittle, and hence, the carbon fiber-reinforced plastic material prepared by using the epoxy resin composition for its matrix resin will suffer from reduced strength. On the other hand, when this ratio is in excess of 90, curability of the epoxy resin composition will be insufficient and the cured resin material also becomes brittle, and the carbon fiber-reinforced plastic material prepared by using the epoxy resin composition for its matrix resin will also suffer from reduced strength.

The ratio of the number of the epoxy groups to the number of imidazole rings in the epoxy resin composition can be calculated by the procedure as described below from epoxy equivalent weight of the epoxy resin composition and imidazole ring equivalent weight of the epoxy resin composition.

(i) Average Epoxy Equivalent Weight of the Epoxy Resin Composition

When "n" types of the epoxy resins are simultaneously used in the epoxy resin composition, total parts by weight of the epoxy resin composition is "G", and "$W_x$" parts by weight of the epoxy resin X having the epoxy equivalent weight of "$E_x$" (g/eq) is incorporated, the average epoxy equivalent weight in the epoxy resin composition can be calculated by the following mathematical equation (1) (wherein x=1, 2, 3, . . . , n).

[Mathematical expression 1]

$$\text{Average epoxy equivalent weight of the epoxy resin composition[g/eq]} = \frac{G}{\left\{\left(\frac{W_1}{E_1}\right)+\left(\frac{W_2}{E_2}\right)\ldots+\left(\frac{W_x}{E_x}\right)\ldots+\left(\frac{W_n}{E_n}\right)\right\}} \quad (1)$$

(ii) Imidazole Equivalent Weight of the Epoxy Resin Composition

When the total parts by weight of the epoxy resin composition is "G", and "W" parts by weight of the imidazole compound having an imidazole ring equivalent weight of "I" [g/eq] is incorporated in the epoxy resin composition, the imidazole ring equivalent weight in the epoxy resin composition can be calculated by the following mathematical equation (2):

[Mathematical expression 2]

$$\text{Imidazole ring equivalent weight of the epoxy resin composition [g/eq]} = G/(W/I) \quad (2)$$

(iii) Ratio of the Number of the Epoxy Groups to the Number of Imidazole Rings in the Epoxy Resin Composition The ratio of the number of the epoxy groups to the number of imidazole rings in the epoxy resin composition may be calculated by the following mathematical equation (3) using the values obtained in the (i) and (ii).

[Mathematical expression 3]

$$\text{Ratio of the number of the epoxy groups to the number of imidazole rings in the epoxy resin composition} = (\text{imidazole ring equivalent weight of the epoxy resin composition/average epoxy equivalent weight of the epoxy resin composition}) \quad (3)$$

(Epoxy Equivalent Weight of the Epoxy Resin Composition)

The epoxy resin composition may preferably have an epoxy equivalent weight of at least 250 g/eq and up to 500 g/eq. When the epoxy equivalent weight is less than 250 g/eq or greater than 500 g/eq, the resulting cured article will exhibit poor balance between the modulus and the deformation, and the carbon fiber-reinforced plastic material prepared by using the epoxy resin composition for its matrix resin may also suffer from reduced strength.
(Details of the Component [C])

The imidazole compound used for the component [C] in the present invention is described in further detail.

The imidazole compound used in the present invention is not limited for its state. While the imidazole compound may be a solid or a liquid, it is most preferably an imidazole compound which is soluble in the epoxy resin. When an imidazole compound soluble in the epoxy resin is used, the epoxy resin composition will have a reduced T(100) and the prepreg will have an improved high-speed curability. In addition, the cured resin material will have an improved balance between the modulus and the deformation due to the improved consistency of the epoxy resin composition.

In the present invention, solubility and non-solubility of the imidazole compound in the epoxy resin is determined by the procedure as described below. The epoxy resin composition having the dicyandiamide excluded therefrom is first prepared since dicyandiamide in the epoxy resin composition of the present invention is an insoluble latent curing agent, and then, the state of the epoxy resin composition is visually confirmed. The epoxy resin composition is determined "dissolved" when the resulting epoxy resin composition is transparent, and "not dissolved" when the composition is opaque, namely, turbid or lumpy.

An exemplary preferable imidazole compound used in the present invention is the one having the hydrogen at position 1 of the imidazole ring substituted.

More preferred is the use of an imidazole compound having position 1 of the imidazole ring substituted with benzyl group or cyanoethyl group. An exemplary such compound is the one represented by the following general formula (I) wherein $R_1$ is benzyl group or cyanoethyl group, and $R_2$, $R_3$, and $R_4$ are respectively hydrogen atom, an aliphatic hydrocarbon group containing 1 to 20 carbon atoms, or phenyl group.

[Chemical formula 2]

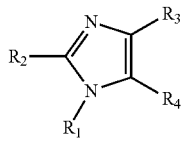

(I)

Many imidazole compounds having position 1 of the imidazole ring substituted with benzyl group or cyanoethyl group are liquid with high solubility in epoxy resin. Examples of the commercially available imidazole include "Cureduct" (Registered Trademark) 1B2MZ, 1B2PZ, 2MZ-CN, 2E4MZ-CN, and 2PZ-CN (manufactured by Shikoku Chemicals Corporation).

Also preferred for the compound having position 1 of the imidazole ring substituted is an adduct produced represented by the following general formula (II) by the reaction of an imidazole compound with an epoxy compound.

[Chemical formula 3]

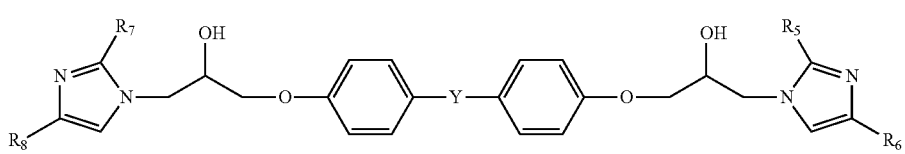

(II)

wherein $R_5$, $R_6$, $R_7$ and $R_8$ are respectively hydrogen atom, an aliphatic hydrocarbon group containing 1 to 20 carbon atoms, or phenyl group and Y is single bond, an alkylene group, an alkylidene group, ether group, or sulfonyl group.

Examples of the commercially available adducts include "Cureduct" (Registered Trademark) P-0505 (Shikoku Chemicals Corporation) and "JER cure" (Registered Trademark) P200H50 (Mitsubishi Chemical Corporation).

Also preferred for the compound having position 1 of the imidazole ring substituted is an adduct produced represented by the following general formula (III) by the reaction of an imidazole compound with an isocyanate compound.

[Chemical formula 4]

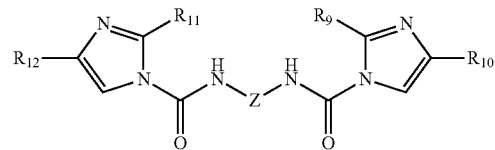

(III)

wherein $R_9$, $R_{10}$, $R_{11}$ and $R_{12}$ are respectively hydrogen atom, a aliphatic hydrocarbon group containing 1 to 20 carbon atoms, or phenyl group, and Z is an alkylene group or an aromatic hydrocarbon group.

An example of the commercially available adduct is G-8009L (DKS Co. Ltd.).

Content of the component [C] in the composition is preferably 0.5 to 8 parts by weight, more preferably 1 to 6 parts by weight, and still more preferably 1.5 to 4 parts by weight in relation to 100 parts by weight of the epoxy resin (component [A]). When the content of the component [C] is in such range, the cured resin material obtained from the resulting epoxy resin composition will enjoy good balance between the storage stability and the curing speed and exhibit good physical properties.

(Component [D])

An acidic compound may be added to the epoxy resin composition of the present invention as the component [D]. When an acidic compound is added, the epoxy resin composition will have an increased T(60) value, and the prepreg will enjoy an improved storage stability.

The acidic compound used may be a Bronsted acid or a Lewis acid.

The Bronsted acid is preferably a carboxylic acid, and the carboxylic acids may be categorized into aliphatic polycarboxylic acids, aromatic polycarboxylic acids, aliphatic monocarboxylic acids, and aromatic monocarboxylic acids. Exemplary compounds are as described below.

Exemplary aliphatic monocarboxylic acid include formic acid, acetic acid, propionic acid, butyric acid, isobutyric acid, valeric acid, caproic acid, enanthic acid, caprylic acid, octyl acid, pelargonic acid, lauryl acid, myristic acid, stearic acid, behenic acid, undecane acid, acrylic acid, methacrylic acid, crotonic acid, oleic acid, and derivatives of these acids.

Exemplary aliphatic polycarboxylic acid include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, and derivatives of these acids.

Exemplary aromatic monocarboxylic acids include benzoic acid, cinnamic acid, naphthoic acid, toluic acid, and derivatives of these acids.

Exemplary aromatic polycarboxylic acids include phthalic acid, isophthalic acid, terephthalic acid, trimellitic acid, pyromellitic acid, and derivatives of these acids.

These aromatic monocarboxylic acids and aromatic polycarboxylic acids may be substituted with hydroxy group, a halogen, an alkyl group, an aryl group, or the like.

When a Bronsted acid is used for the acidic compound in the present invention, pKa is preferably up to 4.3. When such Bronsted acid having a pKa of up to 4.3 is used, the resulting prepreg will enjoy an improved storage stability.

The pKa of the Bronsted acid may be measured by titration. In the case of an aromatic carboxylic acid, however, the pKa may be roughly estimated by Hammett's rule.

Exemplary preferable aromatic carboxylic acids having a pKa of up to 4.3 include benzoic acid, p-hydroxybenzoic acid, p-nitrobenzoic acid, isophthalic acid, 5-hydroxybenzoic acid, and 5-nitrobenzoic acid.

The Lewis acid is preferably boric acid and/or a borate, or the like.

Examples of the boric acid and/or the borate include boric acid, alkyl borates such as trimethyl borate, triethyl borate, tributyl borate, tri-n-octyl borate, tri(triethylene glycol methyl ether) borate, tricyclohexyl borate, trimenthyl borate, aromatic borates such as tri-o-cresyl borate, tri-m-cresyl borate, tri-p-cresyl borate, and triphenyl borate, and tri(1,3-butanediol) biborate, tri(2-methyl-2,4-pentanediol) biborate, and trioctylene glycol diborate.

The borate used may also be a cyclic borate having a cyclic structure in its molecule. Exemplary cyclic borates include tris-o-phenylene bisborate, bis-o-phenylene pyroborate, bis-2,3-dimethylethylene phenylene pyroborate, and bis-2,2-dimethyltrimethylene pyroborate.

Exemplary products containing such borate include "Cureduct" (Registered Trademark) L-01B (Shikoku Chemicals Corporation) and "Curcduct" (Registered Trademark) L-07N (Shikoku Chemicals Corporation).

Content of the component [D] as described above used is preferably 0.5 to 8 parts by weight, more preferably 1 to 6 parts by weight, and still more preferably 1.5 to 4 parts by weight in 100 parts by weight of the epoxy resin (component [A]). When the content of the component [D] is in such range, the cured resin material obtained from the resulting epoxy resin composition will enjoy good balance between the storage stability and the curing speed and exhibit good physical properties.

(Component [E])

The epoxy resin composition of the present invention may also contain a thermoplastic resin as the component [E] to the extent not adversely affecting the merits of the present invention. While the thermoplastic resin is not the critical component of the present invention, incorporation of the epoxy resin composition enables control of the viscoelasticity and the cured article will be imparted with toughness.

Examples of such thermoplastic resin include polymethyl methacrylate, polyvinyl formal, polyvinyl butyral, polyvinyl acetal, polyvinylpyrrolidone, a polymer containing at least 2 members selected from aromatic vinyl monomer, cyanated vinyl monomer, and rubbery polymer as its constituents, polyamide, polyester, polycarbonate, polyaryleneoxide, polysulfone, polyethersulfone, and polyimide. Examples of the polymer containing at least 2 members selected from aromatic vinyl monomer, cyanated vinyl monomer, and rubbery polymer as its constituents include acrylonitrile-butadiene-styrene copolymer (ABS resin) and acrylonitrile-styrene copolymer (AS resin). The polysulfone and the polyimide may be those having ether bond or amide bond in its backbone chain.

The polymethyl methacrylate, polyvinyl formal, polyvinyl butyral, and polyvinylpyrrolidone are preferable since they have good compatibility with many epoxy resins including bisphenol A type epoxy resin and novolac type epoxy resin and they contribute to the efficient control of the flowability of the epoxy resin composition. The most preferred is polyvinyl formal. Exemplary commercially available products of these thermoplastic resins include "Denka butyral" (Registered Trademark) and "Denka formal" (Registered Trademark) (manufactured by Denki Kagaku Kogyo Kabushiki Kaisha) and "Vinylec" (Registered Trademark) manufactured by INC Corporation.

In the case of the polymers of the polysulfone, polyether sulfone, and polyimide, the resin itself has high heat resistance. They are also polymers having a resin backbone having adequate compatibility with the epoxy resins frequently used in the applications requiring heat resistance, for example, structural members of an air craft, for example, glycidylamine epoxy resins such as tetraglycidyl diamino-diphenylmethane, triglycidyl aminophenol, triglycidyl aminocresol, and tetraglycidylxylenediamine. In additions, use of these resins enables efficient control of flowability of the epoxy resin composition. These resins also have the effect of improving impact strength of the fiber-reinforced resin composite material. Examples of such polymers include "Radel" (Registered Trademark) A (manufactured by Solvay Advanced Polymers) and "SUMIKAEXCEL" (Registered Trademark) PES (manufactured by SUMITOMO CHEMICAL COMPANY, LIMITED) for the polysulfone and "ULTEM" (Registered Trademark) (manufactured by GE Plastics) and "Matrimid" (Registered Trademark) 5218 (manufactured by Huntsman) for the polyimide.

In the epoxy resin composition of the present invention, 1 to 60 parts by weight of the thermoplastic resin is preferably incorporated in 100 parts by weight of the epoxy resin.

(Incorporation of Inorganic Particles)

The epoxy resin composition used in the present invention may also contain a coupling agent, thermosetting resin particles, electroconductive particles such as carbon black, carbon particles, or metal-plated organic particles, and an inorganic filler such as silica gel or clay to the extent not adversely affecting the present invention. Incorporation of such components has the effect of viscosity adjustment, for example, by improving the viscosity of the epoxy resin composition or reducing the resin flowability, the effect of improving the modulus and heat resistance of the cured resin material, and the effect of improving the abrasion resistance.

(Production Method of the Epoxy Resin Composition)

The epoxy resin composition of the present invention can be produced, for example, by machine kneading using a kneader, planetary mixer, three rolls, or twin screw extruder, or alternatively, by manual blending using a beaker and a spatula if homogeneous kneading is possible.

(Fiber-Reinforced Composite Material)

Next, the fiber-reinforced composite material is described. The fiber-reinforced composite material containing the cured epoxy resin composition of the present invention as its matrix can be produced by blending and integrating the epoxy resin composition of the present invention with a reinforcement fiber, and curing the blend.

The reinforcement fiber used in the present invention is not particularly limited, and examples include glass fiber, carbon fiber, aramid fiber, boron fiber, alumina fiber, and silicon carbide fiber, which may be used in combination of two or more. Of these, the preferred is the used of carbon fiber that enable production of a fiber-reinforced composite material having a light weight and high rigidity.

(Prepreg)

With regard to the production of the fiber-reinforced composite material, it is preferable to preliminarily produce a prepreg comprising the epoxy resin composition and the reinforcement fibers in view of the ease of storage and good handling convenience. The prepreg can be obtained by impregnating the epoxy resin composition of the present invention in the reinforcement fibers. Exemplary methods used for the impregnation include hot melting method (dry method).

The hot melting method is a method wherein the epoxy resin composition whose viscosity is reduced by heating is directly impregnated in the reinforcing fibers, or a method wherein after preliminarily forming a film of epoxy resin composition by coating the rein composition on a release paper or the like, the film is laid on one surface or on both surfaces of the reinforcement fibers, and the resin is impregnated in the reinforcement fibers by applying heat and pressure.

In the formation of the prepreg laminate, the method used for applying the heat and the pressure is not particularly limited and exemplary methods include press molding, autoclave molding, bucking molding, wrapping tape method, or internal pressure molding.

The fiber-reinforced composite material containing the cured product of the epoxy resin composition of the present invention and the reinforcement fibers is well adapted for used in sport applications, general industrial applications, and aerospace applications. More specifically, in the sport applications, the fiber-reinforced composite material is preferable for used in golf shafts, fishing rods, tennis and badminton rackets, hockey sticks and other sticks, and skiing poles. Furthermore, in the general industrial applications, fiber-reinforced composite material is preferable for use in structural material of vehicles such as automobiles, bicycles, ships, and railroad vehicles, drive shaft, plate springs, windmill blades, pressure vessel, flywheels, rollers for paper manufacture, roofing materials, cables, and mending/reinforcing materials.

EXAMPLES

Next, the present invention is described in further detail by referring to the following Examples which by no means limit the scope of the present invention.

The components used in the present invention are as described below.

<Materials Used>

Epoxy Resin [A]

[A]-1 "jER" (Registered Trademark) 828 (liquid bisphenol A type epoxy resin having an epoxy equivalent weight of 189 manufactured by Mitsubishi Chemical Corporation)

[A]-2 "jER" (Registered Trademark) 1007 (solid bisphenol A type epoxy resin having an epoxy equivalent weight of 1925 manufactured by Mitsubishi Chemical Corporation)

[A]-3 "jER" (Registered Trademark) 154 (phenol novolac type epoxy resin having an epoxy equivalent weight of 178 manufactured by Mitsubishi Chemical Corporation)

[A]-4 "HP" (Registered Trademark) 7200H (dicyclopentadiene type epoxy resin having an epoxy equivalent weight of 279 manufactured by DIC Corporation).

Dicyandiamide [B]

[B]-1 DICY7 (dicyandiamide manufactured by Mitsubishi Chemical Corporation).

Imidazole compound [C]

[C]-1 "Curezol" ((Registered Trademark) 1B2MZ (imidazole ring equivalent weight, 172; 1-benzyl-2-methylimidazole, a compound represented by the general formula (I) wherein $R_1$ is benzyl group, $R_2$ is methyl group, $R_3$ and $R_4$ are hydrogen atom manufactured by Shikoku Chemicals Corporation)

[C]-2 G-8009L (imidazole ring equivalent weight, 195; a compound represented by the general formula (III) wherein $R_9$ and $R_{11}$ are ethyl group, $R_{10}$ and $R_{12}$ are methyl group, and Z is hexamethylene group manufactured by DKS Co. Ltd.)

[C]-3 "Cureduct" (Registered Trademark) P-0505 (imidazole ring equivalent weight, 280; a compound represented by the general formula (II) wherein $R_5$ and -$R_7$ are ethyl group, $R_6$ and $R_8$ are methyl group, and Y is isopropylidene group manufactured by Shikoku Chemicals Corporation)

[C]-4 "Curezol" (Registered Trademark) 2PZ (imidazole ring equivalent weight, 144; 2-phenylimidazole manufactured by Shikoku Chemicals Corporation)

[C]-5 "Curezol" (Registered Trademark) 2E4MZ (imidazole ring equivalent weight, 110; 2-ethyl-4-methylimidazole manufactured by Shikoku Chemicals Corporation).

Curing Accelerator [C'] Other than Imidazole Compound

[C']-1 DCMU99 (3-(3,4-dichlorophenyl)-1,1-dimethylurea manufactured by Hodogaya Chemical Co., Ltd.)

[C']-2 "Omicure" (Registered Trademark) 24 (4,4'-methylene bis(phenyldimethyl urea) manufactured by PTI Japan).

Acidic Compound [D]

[D]-1 p-nitrobenzoic acid (pka: 3.4, manufactured by Tokyo Chemical Industry Co., Ltd.)

[D]-2 benzoic acid (pka: 4.2, manufactured by Tokyo Chemical Industry Co., Ltd.)

[D]-3 p-methoxybenzoic acid (pka: 4.5, manufactured by Tokyo Chemical Industry Co., Ltd.)

[D]-4 acetic acid (pka: 4.8, manufactured by Tokyo Chemical Industry Co., Ltd.)

[D]-5 "Cureduct" (Registered Trademark) L-07N (a composition containing 5 parts by weight of a borate compound as the acidic compound manufactured by Shikoku Chemicals Corporation).

Thermoplastic Resin [E]

[E]-1 "Vinylec" (Registered Trademark) K (polyvinyl formal manufactured by JNC Corporation).

<Method for Producing the Epoxy Resin Composition>

(1) Method for Producing Curing Accelerator Master Batch and Curing Agent Master Batch The imidazole compound [C] or the curing accelerator [C'] and, when the acidic compound [D] is used, the acidic compound [D] were added to 10 parts by weight of [A]-1 (jER828) (a liquid resin) (10 parts by weight of the 100 parts by weight of the epoxy resin [A]), and the mixture was kneaded at room temperature by using a kneader. By using three rolls, the mixture was passed twice between the rolls to prepare curing accelerator master batch. After adding the dicyandiamide [B] to the curing accelerator master batch, by using a kneader, the mixture was kneaded at room temperature and, by using three rolls, the mixture was passed twice between the rolls to prepare curing agent master batch.

(2) Production Method of the Epoxy Resin Composition

After placing 90 parts by weight of the epoxy resin [A], namely, the epoxy resin [A] excluding the 10 parts by weight of the [A]-1 (jER828) used in the (1) and the thermoplastic resin [E] in a kneader, the mixture was kneaded while raising the temperature to 150° C., and the kneading was continued at 150° C. for 1 hour to obtain a transparent viscous liquid.

After cooling the viscous liquid to 60° C. while kneading, the curing agent master batch prepared in the (1) was added, and the mixture was kneaded at 60° C. for 30 minutes to prepare the epoxy resin composition.

Blend ratio of components in each Example and Comparative Example is shown in Tables 1 and 2.

<Method for Evaluating Properties of the Resin Composition>

(1) T(100)

3 mg of the epoxy resin composition was weighed and placed on a sample pan, and isothermal measurement for 3 hours was conducted by using a differential scanning colorimeter (Q-2000 manufactured by TA Instrument) after elevating the temperature from 30° C. to 100° C. at 100° C./minute. By using 42 seconds after the start of the temperature elevation for the starting time of the measurement, time interval between the measurement starting time and reaching of the heat flow to the top of the exothermic peak was measured as the time required to reach the peak top in the isothermal measurement at 100° C. The measurement was conducted for 3 samples per one measurement level, and their average was used. The average obtained in this measurement is referred as "T(100)".

(2) T(60)

3 mg of the epoxy resin composition was weighed and placed on a sample pan, and isothermal measurement for 30 hours was conducted by using a differential scanning colorimeter (Q-2000 manufactured by TA Instrument) after elevating the temperature from 30° C. to 60° C. at 100° C./minute. By using 18 seconds after the start of the temperature elevation for the starting time of the measurement, time interval between the measurement starting time and reaching of the heat flow to the top of the exothermic peak was measured as the time required to reach the peak top in the isothermal measurement at 60° C. The measurement was conducted for 3 samples per one measurement level, and their average was used. The average obtained in this measurement is referred as "T(60)". It is to be noted that the value of the T(60) was indicated as "at least 30" when the top of the peak did not appear after 30 hours.

(3) Method for Calculating the Ratio of the Number of Epoxy Groups to the Number of Imidazole Rings (i) Calculation of Average Epoxy Equivalent Weight of the Epoxy Resin Composition When "n" types of the epoxy resins were simultaneously used in the epoxy resin composition, total parts by weight of the epoxy resin composition was "G", and "$W_x$" parts by weight of the epoxy resin X having the epoxy equivalent weight of "$E_x$" (g/eq) was incorporated, the average epoxy equivalent weight in the epoxy resin composition was calculated by the following equation (1) (wherein x=1, 2, 3, . . . , n).

[Mathematical expression 4]

$$\text{Average epoxy equivalent weight of the epoxy resin composition[g/eq]} = \frac{G}{\left\{\left(\frac{W_1}{E_1}\right)+\left(\frac{W_2}{E_2}\right)\ldots+\left(\frac{W_x}{E_x}\right)\ldots+\left(\frac{W_n}{E_n}\right)\right\}} \quad (1)$$

(ii) Calculation of Imidazole Ring Equivalent Weight of the Epoxy Resin Composition When "W" parts by weight of the imidazole compound having an imidazole ring equivalent weight of "I" [g/eq] is incorporated in the epoxy resin composition, the imidazole ring equivalent weight in the epoxy resin composition was calculated by the following equation (2):

[Mathematical expression 5]

$$\text{Imidazole ring equivalent weight of the epoxy resin composition [g/eq]} = G/(W/I) \quad (2)$$

(iii) Calculation of the Ratio of the Number of the Epoxy Groups to the Number of Imidazole Rings in the epoxy resin composition The ratio of the number of the epoxy groups to the number of imidazole rings in the epoxy resin composition was calculated by the following equation (3) using the values obtained in the (i) and (ii).

[Mathematical expression 6]

$$\text{Ratio of the number of the epoxy groups to the number of imidazole rings in the epoxy resin composition} = (\text{imidazole ring equivalent weight of the epoxy resin composition/average epoxy equivalent weight of the epoxy resin composition}) \quad (3)$$

(4) Evaluation of the Solubility of Imidazole in Epoxy Resin

Since dicyandiamide in the epoxy resin composition is an insoluble latent curing agent, the epoxy resin composition having the dicyandiamide excluded therefrom was prepared to confirm the solubility of the imidazole. More specifically, the imidazole compound [C] or the curing accelerator [C'] and, when the acidic compound [D] is used, the acidic compound [D] were added to 10 parts by weight of [A]-1 (jER828) (a liquid resin) (10 parts by weight of the 100 parts by weight of the epoxy resin [A]), and the mixture was kneaded at room temperature by using a kneader. By using three rolls, the mixture was passed twice between the rolls to prepare curing accelerator master batch. After placing 90 parts by weight in total of the epoxy resin [A], namely, the epoxy resin [A] excluding the 10 parts by weight of the [A]-1 (jER828) used in the preceding step and the thermoplastic resin [E] in a kneader, the mixture was kneaded while raising the temperature to 150° C., and the kneading was continued at 150° C. for 1 hour to obtain a transparent viscous liquid. After cooling the viscous liquid to 60° C. while kneading, the curing agent master batch was added, and the mixture was kneaded at 60° C. for 30 minutes to visually confirm the state of the resulting epoxy resin composition.

The epoxy resin composition was determined "dissolved" when the resulting epoxy resin composition was transparent, and "not dissolved" when the composition was opaque, namely, turbid or lumpy.

<Method for Producing the Cured Resin Material and its Evaluation>

(1) Modulus and Deformation of the Cured Resin Material

After defoaming the epoxy resin composition in vacuum, the epoxy resin composition was cured in a mold which has been adjusted so that the cured article would have a thickness of 2 mm by using a "Teflon" (Registered Trademark) spacer having a thickness of 2 mm at a temperature of 130° C. for 90 minutes to obtain the cured resin material in the form of a plate having a thickness of 2 mm. A test piece having a width of 10 mm and a length of 60 mm was cut out from this cured resin material, and three point bending was conducted by using Instron type universal tester (manufactured by Instron Corporation) at a span of 32 mm and a crosshead speed of 100 mm/minute according to JIS K7171 (1994) to measure the modulus and the deformation. The average when measured at the number of the sample of 5 was used for the values of the modulus and the deformation.
<Method for Producing the Prepreg and its Evaluation>
(1) Method for Producing the Prepreg The epoxy resin composition produced according to the <Method for producing the epoxy resin composition> was coated on a release paper by using a film coater to produce a resin film having a Metsuke (=a weight of resin/unit area) of 74 g/m².

This resin film was placed in a prepreg producing apparatus, and by applying heat and pressure, the resin was impregnated from both surfaces of the sheet of carbon fiber "Torayca" (Registered Trademark) T700S (manufactured by Toray Industries, Inc., Metsuke (=a weight of resin/unit area) 150 g/m²) prepared by unidirectionally aligning the fibers. The prepreg thereby produced had a resin content 33% by mass.

(2) Evaluation of High-Speed Curability of the Prepreg

The high-speed curability of the prepreg was evaluated by cutting a 20 cm square test piece out of the prepreg, sandwiching the test piece between a "Teflon" (Registered Trademark) sheet having a thickness of 150 µm, pressing the laminate at 150° C., and evaluating the handling convenience when it was taken out. The handling convenience was evaluated by the following criteria, and A and B were evaluated as "pass".

A: the prepreg was not deformed when it was taken out after 3 minutes,

B: the prepreg was deformed when it was taken out after 3 minutes, while it was not deformed when it was taken out after 5 minutes, C: curing speed was insufficient, and the prepreg was deformed when it was taken out after 5 minutes.

(3) Evaluation of Storage Stability of the Prepreg

The storage stability of the prepreg was evaluated by cutting a 10 cm square test piece out of the prepreg, leaving the test piece at room temperature for 100 days, and measuring increase in the glass transition temperature. The glass transition temperature was measured by placing 8 mg of the prepreg after the storage in a sample pan, and conducting the measurement by using a differential scanning colorimeter (Q-2000: manufactured by TA Instrument) and increasing the temperature from −50° C. to 50° C. at a rate of 10° C./minute. Middle point of the flexion points in the exothermic curve obtained was used for the Tg.

<Evaluation of the Carbon Fiber-Reinforced Plastic (CFRP) Material>
(1) Method for Producing Unidirectional CFRP Laminate The unidirectional laminate used for the evaluation of the CFRP properties was produced by the method as described below. 13 plies of the unidirectional prepregs prepared by the <Method for producing the prepreg> as described above were laminated by aligning the direction of the fibers. The prepreg laminate was tightly covered with nylon films, and the laminate was cured by applying heat and pressure for 2 hours in an autoclave at a temperature of 130° C. and internal pressure of 0.3 MPa to produce the unidirectional laminate.

(2) Evaluation of 0° Flexural Strength of the CFRP

A test piece having a thickness of 2 mm, a width of 15 mm, and a length of 100 mm was cut out from the unidirectional laminate produced as described above. Three point bending was conducted according to JIS K7074 (1988) by using Instron type universal tester (manufactured by Instron Corporation). The measurement was conducted at a span of 80 mm, a crosshead speed of 5.0 mm/minute, an indenter diameter of 10 mm, and a span diameter of 4.0 mm to obtain the 0° flexural strength. The average when measured at the number of the sample of 6 was used for the values of the 0° flexural strength.

(3) Evaluation of 90° Flexural Strength of the CFRP

A test piece having a thickness of 2 mm, a width of 15 mm, and a length of 60 mm was cut out from the unidirectional laminate produced as described above. Three point bending was conducted according to JIS K7074 (1988) by using Instron type universal tester (manufactured by Instron Corporation). The measurement was conducted at a span of 40 mm, a crosshead speed of 1.0 mm/minute, an indenter diameter of 10 mm, and a span diameter of 4.0 mm to obtain the 90° flexural strength. The average when measured at the number of the sample of 6 was used for the values of the 90° flexural strength.

Example 1

40 parts by weight of "jER" (Registered Trademark) 828, 30 parts by weight of "jER" (Registered Trademark) 1007, and 30 parts by weight of HP7200H as the epoxy resin [A]; 4.0 parts by weight of DICY7 as the dicyandiamide [B] (the curing agent); 2.2 parts by weight of "Curezol" (Registered Trademark) 1B2MZ as the imidazole compound [C] (the curing accelerator); 3.0 parts by weight of p-nitro benzoic acid as the acidic compound [D]; 2.0 parts by weight of "Vinylec" (Registered Trademark) K as the thermoplastic resin [E] were used, and the epoxy resin composition was prepared according to the <Method for producing the epoxy resin composition>.

This epoxy resin composition was evaluated for T(100) and T(60). T(100) was 24 minutes and T(60) was at least 30 hours.

The ratio of the number of the epoxy groups to the number of imidazole rings in the epoxy resin composition was 26, and the imidazole was dissolved in the epoxy resin.

The epoxy resin composition was cured by the procedure described in the <Method for producing the cured resin material and its evaluation> to prepare the cured resin material, and the cured resin material was subjected to the three point bending test which is also described in the <Method for producing the cured resin material and its evaluation>. The cured resin material had good mechanical properties with the modulus of 3.5 GPa and the deformation of 7.3 mm.

In addition, a prepreg was produced from the epoxy resin composition by the method described in <Method for producing the prepreg and its evaluation>. The resulting prepreg had sufficient tack and drapability. When the resulting prepreg was evaluated for the high-speed curability and storage stability by the method described in <Method for producing the prepreg and its evaluation>, the prepreg was cured at 150° C. to the degree not showing the deformation in 3 minutes, and at 25° C., the prepreg did not show increase in the Tg after storage for 100 days, and therefore, the prepreg had sufficient high-speed curability and storage stability.

The prepreg was laminated and cured by the method described in the <Evaluation of the carbon fiber-reinforced plastic (CFRP) material> to produce a unidirectional laminate, and when the three point bending test was conducted, the 0° flexural strength was 1498 MPa and the 90° flexural strength was 111 MPa, demonstrating the good mechanical properties of the CFRP.

Examples 2 to 13

The epoxy resin composition, the cured resin material product, and the prepreg were prepared by repeating the procedure of Example 1 except that the resin composition was changed to compositions respectively shown in Table 1. The resulting prepregs exhibited sufficient tack and drapability as in the case of Example 1.

The epoxy resin composition of each Example had the T(100), the T(60), and the ratio of the number of the epoxy groups to the number of imidazole rings in the epoxy resin composition were as shown in Table 1.

When the prepreg was evaluated for the high-speed curability and the storage stability as in the case of the Example 1, the prepreg exhibited sufficient high-speed curability and storage stability in all levels.

The cured resin material exhibited good values of the modulus and the deformation, and the CFRP also exhibited good mechanical properties.

Comparative Example 1

The epoxy resin composition, the prepreg, and the cured resin material were produced by repeating the procedure of the Example 1 except that the curing accelerator was changed to DCMU99 (3.0 parts by weight) and the acidic compound was not added. The resin composition and the results of the evaluation are shown in Table 2. The prepreg exhibited good storage stability and good properties of the cured article. The resulting prepreg, however, was insufficient in the high-speed curability with the T(100) value of the epoxy resin composition of 40 minutes (namely, longer than 25 minutes).

Comparative Example 2

The epoxy resin composition, the prepreg, and the cured resin material were produced by repeating the procedure of Example 1 except that curing accelerator was changed to "Omicure" (Registered Trademark) 24 (3.0 parts by weight) and the acidic compound was not added. The resin composition and the results of the evaluation are shown in Table 2. The prepreg had good high-speed curability and the resulting cured resin material also had good properties. The resulting prepreg, however, was insufficient in the storage stability with the T(60) value of the epoxy resin composition of 10 hours (namely, less than 15 hours).

Comparative Example 3

The epoxy resin composition, the prepreg, and the cured resin material were produced by repeating the procedure of Example 1 and using the composition of Example 2 except that amount of the p-nitrobenzoic acid used was changed to 0.5 part by weight. The resin composition and the results of the evaluation are shown in Table 2. The prepreg had good high-speed curability and the resulting cured resin material also had good properties. However, the prepreg was insufficient in the storage stability with the T(60) value of the epoxy resin composition of 13 hours (namely, less than 15 hours).

Comparative Example 4

The epoxy resin composition, the prepreg, and the cured resin material were produced by repeating the procedure of Example 1 by using the same composition as Example 4 except that the amount of the G-8009L used was 0.7 parts by weight and the amount of p-nitrobenzoic acid was 1.0 parts by weight. The resin composition and the results of the evaluation are shown in Table 2. The prepreg had good storage stability. However, the resulting prepreg was insufficient in the high-speed curability with the T(100) value of the epoxy resin composition of 38 minutes (namely, longer than 25 minutes). The balance between the modulus and the deformation of the cured resin material was also poor with the ratio of the number of the epoxy groups to the number of imidazole rings in the epoxy resin composition of 93 (greater than 90). The 90° flexural strength of the CFRP was also as low as 84 MPa.

Comparative Example 5

The epoxy resin composition, the prepreg, and the cured resin material were produced by repeating the procedure of the Example 1 by using the same composition as Example 8 except that amount of the "Cureduct" (Registered Trademark) P-0505 was 4.5 parts by weight and the amount of the "Cureduct" (Registered Trademark) L-07N was 3.0 parts by weight. The resin composition and the results of the evaluation are shown in Table 2. The prepreg had good storage stability and high-speed curability. The balance between the modulus and the deformation of the cured resin material was also poor with the ratio of the number of the epoxy groups to the number of imidazole rings in the epoxy resin composition of 21 (less than 25). The 90° flexural strength of the CFRP was also as low as 83 MPa.

Comparative Example 6

The epoxy resin composition, the prepreg, and the cured resin material were produced by repeating the procedure of the Example 1 except that the curing accelerator was changed to "Curezol" (Registered Trademark) 2E4MZ (1.2 parts by weight), and the acidic compound was not added. The resin composition and the results of the evaluation are shown in Table 2. The prepreg had good high-speed curability and the resulting cured resin material also had good properties. However, the prepreg was insufficient in the storage stability with the T(60) value of the epoxy resin composition of 4 hours (namely, less than 15 hours).

Comparative Example 7

The epoxy resin composition, the prepreg, and the cured resin material were produced by repeating the procedure of the Example 1 except that the resin composition was changed as shown in Table 2. The results of the evaluation are shown in Table 2. While prepreg had good storage stability, it suffered from insufficient high-speed curability with the T(100) value of the epoxy resin composition of 40 minutes (longer than 25 minutes). The resulting cured resin material also suffered from poor balance between the modulus and the deformation. The CFRP also had low 0° flexural strength of 1385 MPa.

TABLE 1

| | | | Ex. 1 | Ex. 2 | Ex. 3 | Ex. 4 | Ex. 5 | Ex. 6 | Ex. 7 | Ex. 8 | Ex. 9 | Ex.10 | Ex. 11 | Ex. 12 | Ex. 13 |
|---|---|---|---|---|---|---|---|---|---|---|---|---|---|---|---|
| Resin composition [parts by weight] | Epoxy resin | [A]-1: jER ®828 | 40 | 40 | 40 | 40 | 40 | 40 | 40 | 40 | 70 | 70 | 70 | 40 | 40 |
| | | [A]-2: jER ®1007 | 30 | 30 | 30 | 30 | 30 | 30 | 30 | 30 | | | | 30 | 30 |
| | | [A]-3: jER ®154 | 30 | 30 | 30 | 30 | 30 | 30 | 30 | 30 | 30 | | | 30 | 30 |
| | | [A]-4: jER ®7200H | | | | | | | | | | 30 | | | |
| | Dicyandiamide | [B]-1: DICY7 | 4.0 | 4.0 | 4.0 | 4.0 | 4.0 | 4.0 | 4.0 | 4.0 | 5.2 | 5.2 | 4.0 | 4.0 | 4.0 |
| | Curing accelerator Imidazole compound | [C]-1: Curezol ® 1B2MZ | 2.2 | | | | | | | | | | | | |
| | | [C]-2: G-8009L | | 2.0 | 2.0 | | | | | | | | | | |
| | | [C]-3: Cureduct ® P-0505 | | | | 3.0 | 3.0 | 3.0 | 3.0 | 3.0 | 3.0 | 3.0 | 3.0 | 1.8 | 1.8 |
| | | [C]-4: Curezol ® 2PZ | | | | | | | | | | | | 2.0 | |
| | Acidic compound | [D]-1: p-nitrobenzoic acid | | 3.0 | 2.0 | | | | | | | | 2.0 | | |
| | | [D]-2: Benzoic acid | | | | | 2.0 | | | | | | | | |
| | | [D]-3: p-methoxybenzoic acid | | | | | | 2.0 | | | | | | | |
| | | [D]-4: Acetic acid | | | | | | | 2.0 | | | | | | |
| | | [D]-5: Cureduct ® L-07N | | | | 3.0 | | | | 2.0 | 3.0 | 3.0 | | | 3.5 |
| | Thermoplastic resin | [E]-1: Vinylec ® K | 24 | 2.0 | 2.0 | 2.0 | 2.0 | 2.0 | 2.0 | 2.0 | 3.0 | 3.0 | 2.0 | 2.0 | 2.0 |
| Measurement results | Properties of the resin composition | [a]: T(100) [min] | at least 30 | 23 | 22 | 24 | 23 | 22 | 21 | 20 | 19 | 19 | 22 | 25 | 25 |
| | | [b]: T(60) [hour] | | 21 | at least 30 | 21 | 20 | 16 | 15 | at least 30 | 16 | 16 | 19 | at least 30 | at least 30 |
| | | Average epoxy equivalent weight [g/eq] | 333 | 329 | 332 | 332 | 332 | 332 | 332 | 335 | 210 | 208 | 232 | 333 | 330 |
| | | Imidazole ring equivalent weight [g/eq] | 8695 | 10699 | 10796 | 10361 | 10361 | 10361 | 10361 | 10454 | 10563 | 10470 | 10361 | 8905 | 8825 |
| | | [c]: Ratio of epoxy group/imidazole ring | 26 | 33 | 33 | 31 | 31 | 31 | 31 | 31 | 50 | 50 | 45 | 27 | 27 |
| | | Solubility of curing accelerator in epoxy resin | Dissolved | Dissolved | Dissolved | Dissolved | Dissolved | Dissolved | Dissolved | Dissolved | Dissolved | Dissolved | Dissolved | Not dissolved | Not dissolved |
| | Properties of cured resin material | Modulus of cured resin article [GPa] | 3.5 | 3.6 | 3.5 | 3.6 | 3.7 | 3.6 | 3.7 | 3.8 | 3.5 | 3.6 | 3.4 | 3.5 | 3.6 |
| | | Deformation of cured resin article [mm] | 7.3 | 6.8 | 8.1 | 7.2 | 6.5 | 6.5 | 6.2 | 7.4 | 6.2 | 6.5 | 5.6 | 6.3 | 6.1 |
| | Properties of prepreg | High-speed curability (pressed under heating to 150° C.) A: at least 3 min, B: at least 5 min, C: longer than 5 min | A | A | A | A | A | A | A | A | A | A | A | B | B |
| | | Storage stability (increase of $T_g$ after 25° C./100 day) [° C.] | 0 | 2 | 0 | 3 | 5 | 7 | 9 | 1 | 6 | 6 | 5 | 0 | 1 |
| | Properties of CFRP | 0° flexural strength [MPa] | 1498 | 1530 | 1489 | 1521 | 1559 | 1530 | 1568 | 1603 | 1505 | 1523 | 1468 | 1504 | 1518 |
| | | 90° flexural strength [MPa] | 111 | 110 | 114 | 115 | 109 | 110 | 106 | 117 | 108 | 107 | 99 | 111 | 106 |

TABLE 2

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Resin composition [parts by weight] | Epoxy resin [A]-1: jER ®828 | 40 | 40 | 40 | 40 | 40 | 40 | 30 |
| | [A]-2: jER ®1007 | 30 | 30 | 30 | 30 | 30 | 30 | 70 |
| | [A]-3: jER ®154 | 30 | 30 | 30 | 30 | 30 | 30 | |
| | [A]-4: HP ®7200H | | | | | | | |
| | Dicyandiamide [B]-1: DICY7 | 4.0 | 4.0 | 4.0 | 4.0 | 4.0 | 4.0 | 2.3 |
| | Curing accelerator Imidazole compound [C]-2: G-8009L | | | 2.0 | 0.7 | | | |
| | [C]-3: Cureduct ® P-0505 | | | | | 4.5 | | |
| | [C]-4: Curezol ® 2PZ | | | | | | | |
| | [C]-5: Curezol ® 2E4MZ | | | | | | 1.2 | 1.0 |
| | [C']-1: DCMU99 | 3.0 | | | | | | |
| | [C']-2: Omicure ® 24 | | 3.0 | | | | | |
| | Acidic compound [D]-1: p-nitrobenzoic acid | | | 0.5 | 1.0 | | | |
| | [D]-5: Cureduct ® L-07N | | | | | 3.0 | | |
| | Thermoplastic resin [E]-1: Vinylec ® K | 2.0 | 2.0 | 2.0 | 2.0 | 2.0 | 2.0 | 2.0 |
| Properties of the resin composition | [a]: T(100) [min] | 40 | 22 | 22 | 38 | 18 | 17 | 40 |
| | [b]: T(60) [hour] | 20 | 10 | 13 | at least 30 | 15 | 4 | 20 |
| Measurement results | Average epoxy equivalent weight [g/eq] | 326 | 326 | 325 | 322 | 339 | 321 | 553 |
| | Imidazole ring equivalent weight [g/eq] | 0 | 0 | 10553 | 29929 | 7063 | 9828 | 30052 |
| | [c]: Ratio of epoxy group/imidazole ring | 0 | 0 | 33 | 93 | 21 | 31 | 54 |
| | Solubility of curing accelerator in epoxy resin | Dis-solved | Dis-solved | Dis-solved | Dis-solved | Dis-solved | Dis-solved | Dis-solved |
| Properties of cured resin material | Modulus of cured resin material [GPa] | 3.5 | 3.5 | 3.6 | 3.8 | 3.7 | 3.7 | 3.2 |
| | Deformation of cured resin material [mm] | 8.3 | 7.2 | 6.2 | 4.9 | 4.0 | 6.0 | 12.0 |
| Properties of prepreg | High-speed curability (pressed under heating to 150° C.) A: at least 3 min, B: at least 5 min, C: longer than 5 min | C | A | A | C | A | A | C |
| | Storage stability (increase of $T_g$ after 25° C./100 day) [° C.] | 5 | 13 | 11 | 0 | 7 | 25 | 5 |
| Properties of CFRP | 0° flexural strength [MPa] | 1489 | 1502 | 1529 | 1585 | 1554 | 1571 | 1385 |
| | 90° flexural strength [MPa] | 114 | 110 | 104 | 84 | 83 | 101 | 101 |

INDUSTRIAL APPLICABILITY

The epoxy resin composition for fiber-reinforced composite material of the present invention is well adapted for use as the matrix resin of the fiber-reinforced composite material since it has high-level storage stability simultaneously with high-level high-speed curability, and the cured resin material after its curing has excellent mechanical properties. The prepreg and the fiber-reinforced composite material of the present invention are preferable for use in sport applications, general industrial applications, and aerospace applications.

The invention claimed is:

1. A prepreg for fiber-reinforced composite material comprising reinforcement fibers and an epoxy resin composition, wherein the epoxy resin composition comprises the following components [A], [B], [C], and [D]:
   [A] an epoxy resin having an average epoxy equivalent weight of from at least 250 g/eq to up to 500 g/eq,
   [B] a dicyandiamide,
   [C] an imidazole compound represented by the general formula (II):

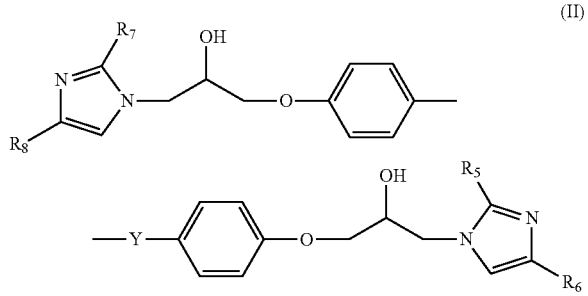

(II)

wherein R5, R6, R7, and R8 are each independently a hydrogen atom, an aliphatic hydrocarbon group containing 1 to 20 carbon atoms, or a phenyl group, and Y is a single bond, an alkylene group, an alkylidene group, an ether group, or a sulfonyl group, and
   [D] a borate ester as an acidic compound,
   wherein the epoxy resin composition satisfies the following conditions [a], [b], and [c]:
   [a] time interval between reaching to 100° C. and reaching of the heat flow to the top of the peak is up to 25 minutes when the epoxy resin composition is isothermally analyzed at 100° C. by using a differential scanning colorimeter in nitrogen stream,
   [b] time interval between reaching to 60° C. and reaching of the heat flow to the top of the peak is at least 15 hours when the epoxy resin composition is isothermally analyzed at 60° C. by using a differential scanning colorimeter in nitrogen stream, and
   [c] ratio of the number of the epoxy groups to the number of imidazole rings in the epoxy resin composition is at least 25 and up to 90.

2. A prepreg according to claim 1 wherein the component [C] is dissolved in the epoxy resin composition.

3. The prepreg according to claim 1, wherein the borate ester is selected from the group consisting of alkyl borates, aromatic borates, and cyclic borates.

4. The prepreg according to claim 1, wherein the borate ester is selected from the group consisting of trimethyl borate, triethyl borate, tributyl borate, tri-n-octyl borate, tri(triethylene glycol methyl ether) borate, tricyclohexyl borate, trimenthyl borate, tri-o-cresyl borate, tri-m-cresyl borate, tri-p-cresyl borate, triphenyl borate, tri(1,3-butanediol) biborate, tri(2-methyl-2,4-pentanediol) biborate, trioctylene glycol diborate, tris-o-phenylene bisborate, bis-o-phenylene pyroborate, bis-2,3-dimethylethylene phenylene pyroborate, and bis-2,2-dimethyltrimethylene pyroborate.

5. A prepreg according to claim 1, wherein the reinforcement fibers include carbon fibers.

6. A fiber-reinforced composite material produced by curing the prepreg according to claim 1.

* * * * *